(12) United States Patent
Lin

(10) Patent No.: US 7,535,519 B2
(45) Date of Patent: May 19, 2009

(54) LIQUID CRYSTAL DISPLAY AND THIN FILM TRANSISTOR SUBSTRATE THEREFOR

(75) Inventor: Hsueh-Hui Lin, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 253 days.

(21) Appl. No.: 11/563,968

(22) Filed: Nov. 28, 2006

(65) Prior Publication Data

US 2007/0296879 A1 Dec. 27, 2007

(30) Foreign Application Priority Data

Jun. 22, 2006 (TW) ............................. 95122549 A

(51) Int. Cl.
*G02F 1/1343* (2006.01)
(52) U.S. Cl. ...................................... 349/38
(58) Field of Classification Search ................. 349/38, 349/39
See application file for complete search history.

(56) References Cited

U.S. PATENT DOCUMENTS

| | | | |
|---|---|---|---|
| 5,953,088 A | 9/1999 | Hanazawa et al. |
| 6,259,493 B1 | 7/2001 | Nakamura et al. |
| 6,400,427 B1 | 6/2002 | Hanazawa et al. |
| 6,633,360 B2 | 10/2003 | Okada et al. |
| 6,856,369 B2 | 2/2005 | Tanaka |
| 7,196,745 B2 * | 3/2007 | Enda et al. ................. 349/38 |

FOREIGN PATENT DOCUMENTS

| | | |
|---|---|---|
| JP | 11242244 | 9/1999 |
| JP | 2001281696 | 10/2001 |
| KR | 20000005852 | 1/2000 |
| KR | 1020000071449 | 11/2000 |
| KR | 20030058217 | 7/2003 |

OTHER PUBLICATIONS

English language translation of abstract of KR 1020000071449.
English language translation of abstract of KR 20000005852.
English language translation of abstract of KR 20030058217.
English language translation of abstract of JP 2001281696.
English language translation of abstract of JP 11242244.

* cited by examiner

*Primary Examiner*—Sarah Song
(74) *Attorney, Agent, or Firm*—Thomas, Kayden, Horstemeyer & Risley

(57) ABSTRACT

Disclosed is a liquid crystal display mainly including a plurality of pixel electrodes, scanning lines, signal lines and auxiliary capacitor lines on a thin film transistor (TFT) substrate, and a light-shielding matrix on a color filter (CF). Each signal line is bent between two adjacent scanning lines, so as to form a first portion, a second portion and two connection portions connecting the first and second portions. The first and the second portions are respectively covered with opposite side portions of two adjacent pixel electrodes. Each auxiliary capacitor line has a main body parallel to the scanning line and an extension portion extending outwardly from the main body. The extension portion of each auxiliary capacitor line is located between the two connection portions of the data line.

20 Claims, 5 Drawing Sheets

LIQUID CRYSTAL DISPLAY AND THIN FILM TRANSISTOR SUBSTRATE THEREFOR

RELATED APPLICATIONS

The present application is based on, and claims priority from, Taiwan Application Serial Number 95122549, filed Jun. 22, 2006, the disclosure of which is hereby incorporated by reference herein in its entirety.

FIELD OF THE INVENTION

This invention relates generally to a liquid crystal display (LCD), and more particularly, to an LCD having storage capacitors.

BACKGROUND OF THE INVENTION

Flat panel displays, such as liquid crystal displays (LCDs), plasma display panels (PDPs), electroluminescent displays (ELDs) and vacuum fluorescent displays (VFDs), are popularly commercialized due to their small size and less power consumption. Among these flat panel displays, the LCD is the most popular in development owing to its good performance and less power consumption, even though it has many disadvantages.

Contrary to the prior monolithic transistor formed on a semiconductor substrate, a thin film transistor (TFT) is fabricated by stacking several films over a substrate. Therefore, the TFT possesses a simpler and easy-fabricated structure than the prior monolithic transistor. For this reason, the TFT has widely served as a switch device of, for example, large-size electric devices (e.g., LCDs). In order to make the image of TFT-LCD to be consistently, the signal voltage input to the data lines must be held constantly in a particular period of time before the next signal is being input. Consequently, for enhancing the image quality of LCD, a storage capacitor is generally disposed in each pixel region.

FIG. 1 depicts a pixel layout of a prior LCD. As shown in FIG. 1, a plurality of scanning g lines 2 and data lines 5 arranged in array are formed over a substrate 1. A pixel region denotes a region surrounded by two adjacent scanning lines and two adjacent data lines. Each pixel region has a pixel electrode 4 disposed therein. The pixel electrode 4 is connected to a semiconductor layer 3 by a drain 7. The semiconductor layer 3 is formed on the scanning line 2 and connected to the data line 5 by a source. Besides, each pixel region has a capacitor electrode 10 disposed therein.

Since there are some demands, for example, better displaying brightness and saving power consumption, for the LCD, the higher aperture ratio is better. For accomplishing higher aperture ratio (i.e., the ratio of transparent area), an LCD in which pixel electrodes overlap data lines has been developed. However, the construction in which the pixel electrodes overlap the data lines invites an increased coupling capacitance Csd between the pixel electrodes and data lines. If the coupling capacitances Csd1/Csd2 respectively generated from the both sides of the pixel electrode and adjacent data lines are held coherently, ill influence on the image quality caused by the coupling capacitance would be effectively reduced. Nevertheless, the pixel electrodes and the data lines are greatly different in photolithographic processes, so it is very hard to make the pixel electrodes precisely aligned to the data lines. Hence, when the misalignment occurs, the coupling capacitances Csd1/Csd2 respectively generated from the both sides of the pixel electrode and adjacent data lines cannot be held coherently, that leads uneven displaying on the LCD.

Thus, U.S. Pat. No. 6,633,360 B2 discloses an LCD having S-shaped data lines 8, as shown in FIG. 2, for solving the problem due to variations in the coupling capacitance Csd caused by misalignment of the aforementioned process. However, for considering the assembling precision to prevent light from leaking, a black matrix (BM) 9 disposed over the color filter (CF) substrate is generally designed to be wide enough to completely cover the S-shaped data lines 8. But it will induce that the aperture ratio of the LCD is severely lowered. In addition, the capacitor electrode 10 is generally formed by opaque electrically conductive metal, for example, aluminum, chromium, tantalum of molybdenum, so as to further lower the aperture ratio (i.e., the ratio of transparent area).

As described above, there is an urgent need to solve the problem of the LCD and the TFT substrate therefore with respect to variations in the coupling capacitance Csd and decreased aperture ratio.

SUMMARY OF THE INVENTION

Accordingly, it is an object of the present invention to provide an LCD and a TFT substrate therefor, which can reduce the occurrence caused by the variations in the coupling capacitance Csd and increase aperture ratio simultaneously, thereby overcoming or at least improving the problems existed in the prior art.

It is another object of the present invention to provide an LCD and a TFT substrate therefor, which can increase capacity of the storage capacitors.

According to the aforementioned objects of the present invention, an LCD is provided, which comprises a plurality of pixel electrodes, scanning lines, data lines and auxiliary capacitor lines disposed over a TFT substrate, and a light-shielding matrix disposed over a CF substrate.

In order to achieve the above-mentioned objects, in a preferred embodiment of the present invention, each aforementioned data line is bent between two adjacent scanning lines to form a first portion, a second portion and two connection portions connecting the first and second portions. The first and second portions are covered respectively with opposite side portions of the two adjacent pixel electrodes, so as to effectively reduce undesired influence on variations in the coupling capacitance Csd due to misalignment between the pixel electrodes and data lines. Each auxiliary capacitor line has a main body in parallel to the scanning lines and an extension portion extending outwardly from the main body. It is worth noticing that, the extension portion of each auxiliary capacitor line is disposed between the two connection portions of the corresponding data lines. Preferably, the extension portion of each auxiliary capacitor line, either a part or a whole of which, is covered with the light-shielding matrix. Therefore, even though the auxiliary capacitor lines are typically formed from opaque and electrically conductive metal material, the extension portion still provides additional storage capacitance but reduces no transparent area, since it is wholly disposed within an area covered with the light-shielding matrix.

In another preferred embodiment of the present invention, the aforementioned connection lines, which connect a drain formed on the TFT substrate and the auxiliary capacitor electrode, have at least a part disposed between the connection portion of the corresponding data line and an adjacent scanning line, thereby providing larger transparent area.

In a further preferred embodiment of the present invention, the aforementioned first portion of each data line further has a protrudent portion, which is disposed above the scanning lines and serves as a source.

As described above, with the design of the aforementioned storage capacitor, the present invention can reduce the opaque area to increase the transparent area in the structure of the solution to the data lines generated from the variations in the coupling capacitance Csd; additional storage capacitance supplied with the extension portion of the auxiliary capacitor lines also provides the enough storage capacitance. Hence, the LCD utilizing the design of the storage capacitor of the present invention possesses high aperture ratio, and it is still capable of providing enough storage capacitance.

BRIEF DESCRIPTION OF THE DRAWINGS

The foregoing objects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Even though the present invention appears various types of embodiments, the following description and accompanying drawings related thereof are preferred embodiments of the present invention. It is to be understood that the disclosure is considered examples of the present invention, and the present invention is in no way intended to be limited to such drawings shown and/or particular embodiments described.

Figure 1:
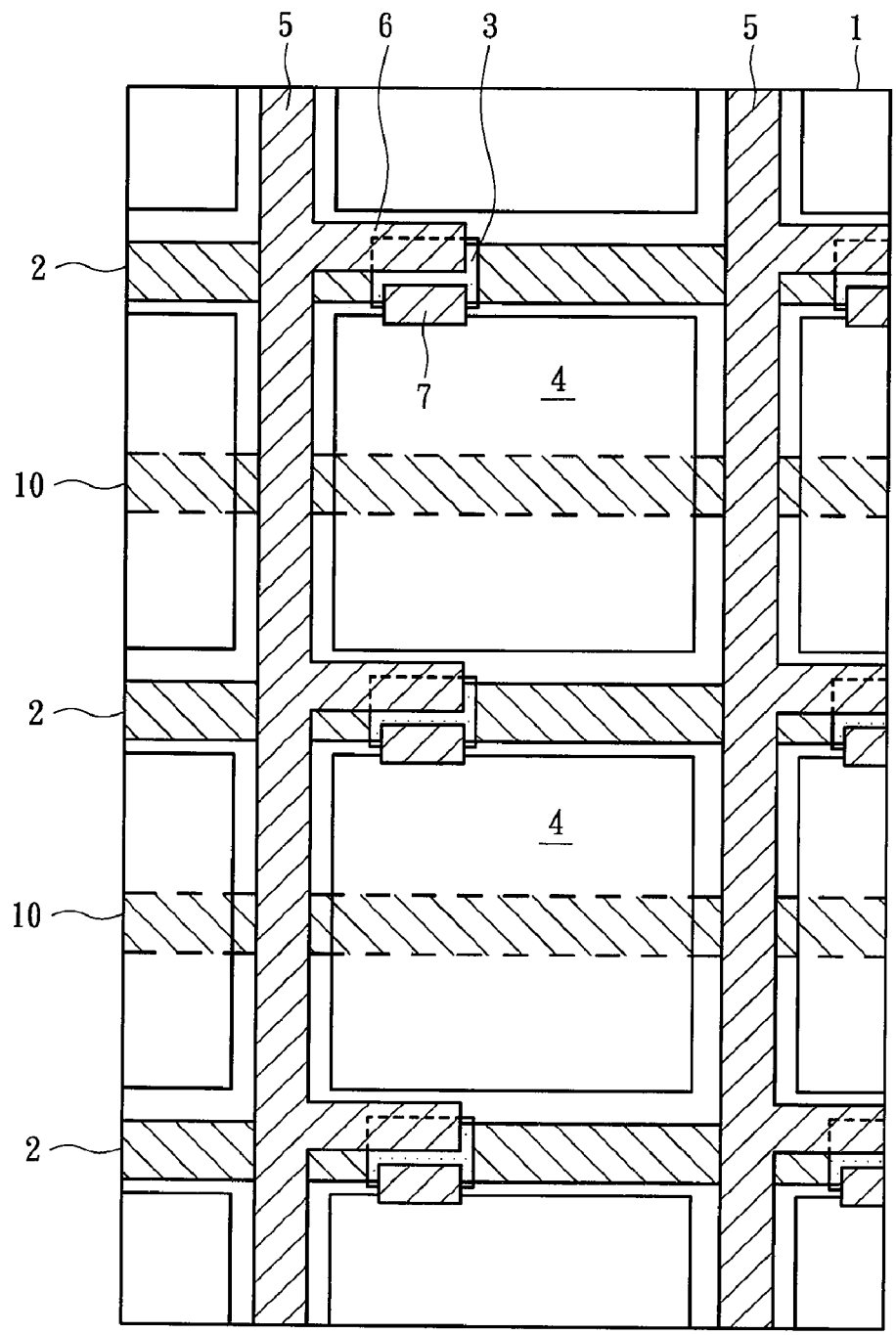
FIG. 1 is a pixel layout of a prior LCD.
Figure 2:
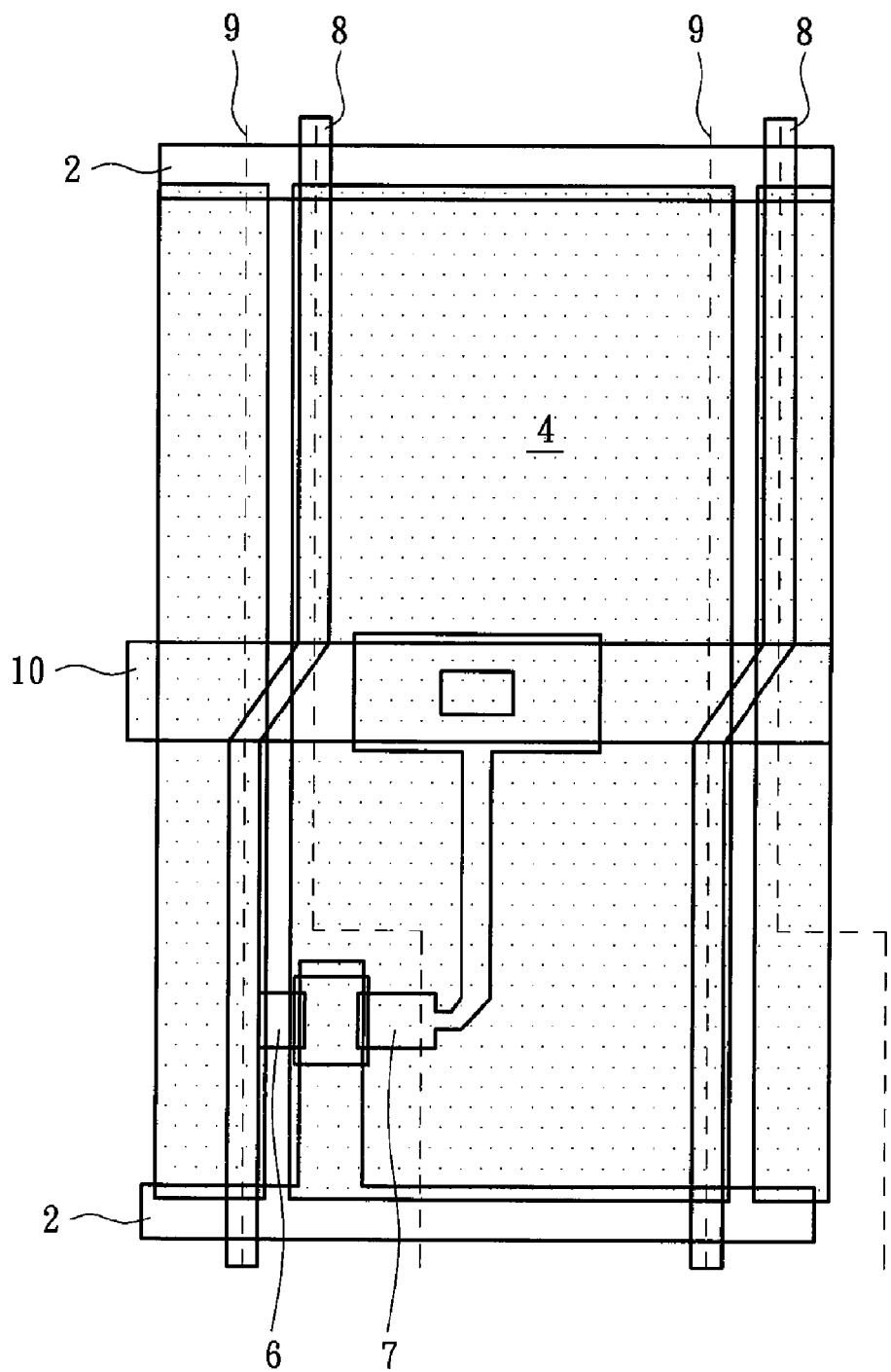
FIG. 2 is a pixel layout of another prior LCD.
Figure 3:
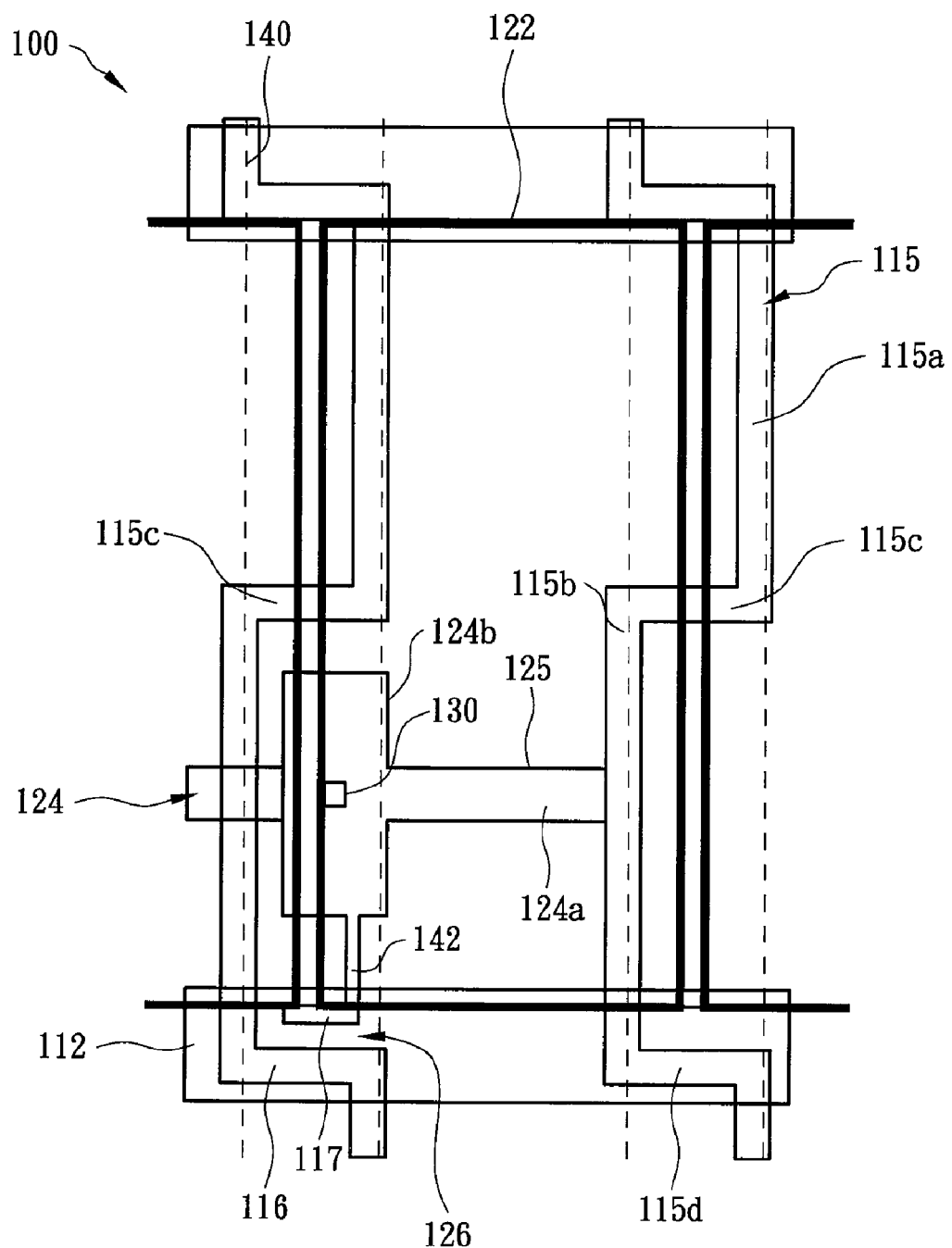
FIG. 3 is a pixel layout of an LCD according to an embodiment of the present invention.

FIG. 3 depicts a pixel layout of an LCD 100 according to one preferred embodiment of the present invention. As shown in FIG. 3, the LCD 100 comprises a liquid crystal layer (not shown) sealed between a first substrate and a second substrate.

Referring to FIG. 3, a plurality of scanning lines 112 are arranged parallel to one another and disposed over the first substrate. A plurality of data lines 115 are disposed parallel to one another and extend along a direction vertical to the scanning lines 112 over the first substrate. The first substrate further has auxiliary capacitor lines 124, which have independent wirings and are parallel to the scanning lines 112. The scanning lines 112 and data lines 115 are configured to form a plurality of pixel regions arranged in array. These scanning lines 112 and data lines 115 are insulated from one another by a gate insulation layer (not shown). The pixel region denotes a region surrounded by two adjacent scanning lines 112 and two adjacent data lines 115. Each pixel region has a pixel electrode 122 and a switch device such as a TFT 126. The TFT 126 is disposed in the vicinity of intersections of adjacent scanning lines 112 and data lines 115. A light-shielding matrix 140 such as a BM, a CF (not shown) for displaying colors, and a transparent electrode such as an ITO electrode (not shown) serving as a common electrode, are disposed over the second substrate. In general, the first substrate is called, for example, a TFT substrate, and the second substrate is called, for example, a CF substrate for its CF disposed thereon. In an alternative embodiment, the light-shielding matrix or the CF may be also disposed over the first substrate.

As shown in FIG. 3, each data line 115 is bent between the two adjacent scanning lines 112, so as to form a first portion 115a, a second portion 115b and a connection portion 115c connecting the first portions 115a and second portions 115b. The first portion 115a is parallel to the second portion 115b, and the connection portion 115c are disposed in the vicinity of the midpoint of two adjacent scanning lines 112, parallel to the scanning lines 112, and across two adjacent pixel region. The first portions 115a and second portions 115b of the data lines 115 are covered respectively with opposite side portions of the two adjacent pixel electrodes 122, thereby considerably reducing ill influence of the variation in the coupling capacitance Csd caused by alignment deviation between the pixel electrode 122 and data lines 115. The data line 115 is bent again while traversing the scanning line 112, so as to form another connection portion 115d, for continuously connecting the next first portion 115a. The TFT 126 comprises a gate electrode and a semiconductor layer (not shown), as well as a source 116 and a drain 117, which are formed from the connection 115d formed by bending and extending the data line 15 above the scanning line 112.

According to the LCD of a preferred embodiment, the storage capacitor (Cs) is disposed in the pixel region. The auxiliary capacitor line 124, the scanning line 112 and the gate electrode used in the TFT 126 are formed of a gate metal layer. An auxiliary capacitor electrode 125, the data line 115, and the source 116 and the drain 117 used in the TFT 126 are formed of a data metal layer. The auxiliary capacitor line 124 is separated from the scanning line 112 by a certain distance and driven independently. The auxiliary capacitor electrode 125 is in approximately transverse T-shaped for being disposed in each pixel region, and overlaps the corresponding auxiliary capacitor line 124. The storage capacitor Cs includes a contact window 130 for electrically connecting to the auxiliary capacitor electrode 125 and the pixel electrode 122, so that the auxiliary capacitor electrode 125 and the corresponding pixel electrode 122 both serve as counter electrodes of the corresponding auxiliary capacitor line 124. The contact window 130 includes a through hole with electrically conductive layer such as Indium Tin Oxide (ITO) connecting therethrough. The auxiliary capacitor line 124 and counter electrodes form a storage capacitor unit. The purpose of the storage capacitor unit is, within a predetermined period of time after turning off the TFT, to hold a voltage of the pixel electrode 122 in a certain range. Since the drain 117 of the TFT 126 is connected to the auxiliary capacitor electrode 125 by a connection line 142, while a scanning signal is input to the scanning line 112, the TFT 126 is turned on to send a data signal from the drain 117 through the connection line 142 to the pixel electrode 122, the auxiliary capacitor electrode 125 and the contact window 130.

The auxiliary capacitor line 124 of the present invention has a main body 124a parallel to the scanning line 112 and an extension portion 124b extending outwardly from the main body 124a. The extending direction of the main body 124a is unparallel to the one of the extension portion 124b. An extending direction of the main body 124a crosses the second portion 115b of the data line 115, and an extending direction of the extension portion 124b is parallel to the second portion 115b of the data line 115. It should be noted that, as shown in FIG. 3, the extension portion 124b of the auxiliary capacitor line 124 is disposed between the connection portions 115c and 115d of the data line 115, and adjacent to the second portion 115b of the data line 115. Therefore, even if the opaque, electrically conductive metal, for example, aluminum, chromium, tantalum or molybdenum, generally forms the auxiliary capacitor line 124, the extension portion 124b is still capable of providing additional storage capacitance but reducing no transparent area, due to the extension portion 124b disposed in the region covered with the light-shielding matrix 140. As shown in FIG. 3 again, in this embodiment, the extension portion 124b is mostly disposed in the region covered with the light-shielding matrix 140. More preferably, the extension portion 124b is wholly disposed in the region covered with the light-shielding matrix 140.

Figure 4:
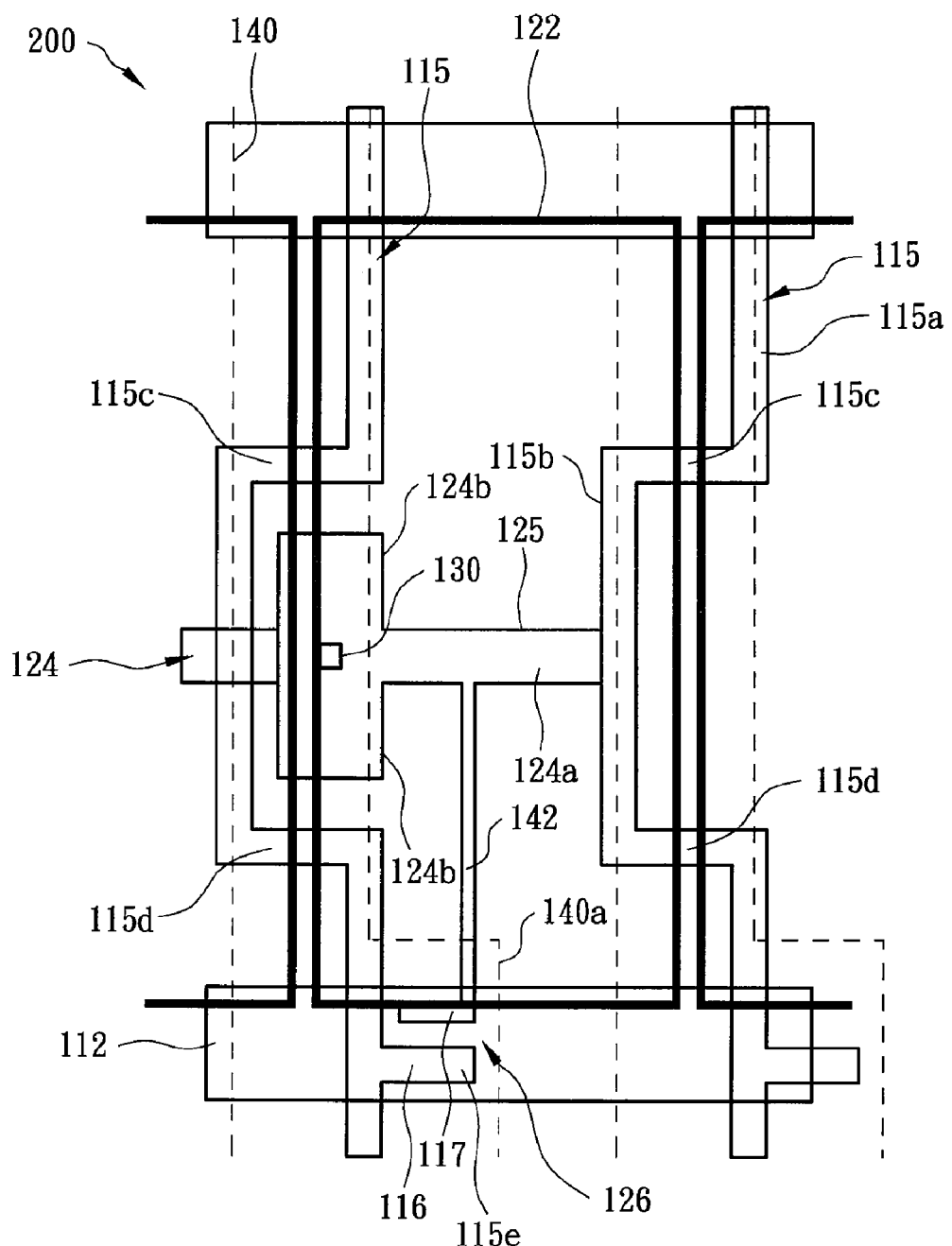
FIG. 4 is a pixel layout of an LCD according to another embodiment of the present invention.

FIG. 4 depicts a pixel layout of an LCD 200 according to another preferred embodiment of the present invention, in which the same symbol refers to the same device. In this embodiment, the data line 115 is bent between the two adjacent scanning lines 112 to form a first portion 115a, a second portion 115b and two connection portions 115c and 15d. The first portion 115a and the TFT 126 driven by that are located in the same pixel region, and the first portion 115a further has a protrudent portion 115e that is disposed above the scanning line 112 and serves as the source 116. In addition, the auxiliary capacitor line 124 has the main body 124a parallel to the scanning line 112 and the extension portion 124b extending outwardly from the main body 124a. The extension portion 124b of the auxiliary capacitor line 124 is disposed between the connection portions 115c and 115d of the data line 115, and the connection portions 115c and 115d are parallel to each other.

As shown in FIG. 4, the light-shielding matrix 140 has an expansion portion 140a that covers the source 116/drain 117 of the TFT 126 and a part of the connection line 142, so as to block outside light and prevent light from leaking out.

Figure 5:
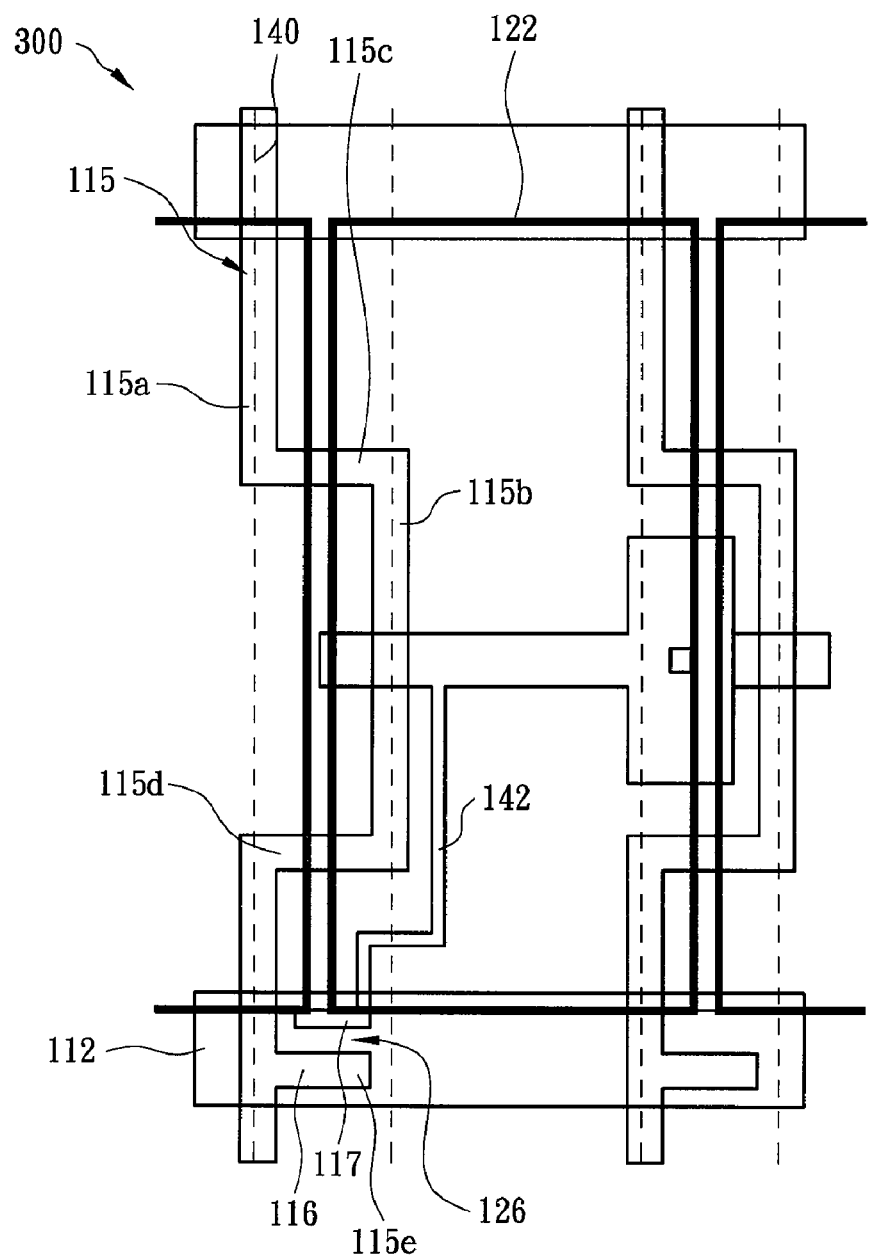
FIG. 5 is a pixel layout of an LCD according to still another embodiment of the present invention.

FIG. 5 depicts a pixel layout of an LCD 300 according to a still another preferred embodiment of the present invention, in which the same symbol refers to the same device. In this embodiment, the data line is bent between the two adjacent scanning lines 112 to form a first portion 115a, a second portion 115b and two connection portions 115c and 115d. The second portion 115b and the TFT 126 driven by that are located in the same pixel region, and the first portion 115a further has a protrudent portion 115e that is disposed above the scanning line 112 and serves as the source 116.

Besides, the auxiliary capacitor line 124 has the main body 124a parallel to the scanning line 112 and the extension portion 124b extending outwardly from the main body 124a. The extension portion 124b of the auxiliary capacitor line 124 is disposed between the connection portions 115c and 115d of the data line 115. The extending direction of the main body 124a crosses the second portion 115b of the data line 115, and the extending direction of the extension portion 124b is be parallel to the second portion 115b of the data line 115. At least a part of the connection line 142 is disposed between the connection portion 115d of the corresponding data line 115 and the adjacent scanning line 112. In comparison with the aforementioned embodiment shown in FIG. 4, this embodiment provides the connection line 142 that has at least a part disposed between the protrudent portion 115e of the data line 115 and the adjacent scanning line 112. Consequently, the light-shielding matrix 140 can cover the source 116/drain 117 of the TFT 126 and a part of the connection line 142, instead of additionally configuring the expansion portion 140a (shown in FIG. 4) disposed thereon, so that the LCD 300 can provide larger transparent area than the LCD 200 shown in FIG. 4.

It is noted, in the LCD 100 shown in FIG. 3, that the connection line 142 connecting the drain 117 and the auxiliary capacitor electrode 142 is disposed between the connection portions 115c and 115d of the data line 115, which allows the light-shielding matrix 140 covering the source 116/drain 117 of the TFT 126, the whole connection line 142 and at least a part of the extension portion 124b, instead of additionally configuring the aforementioned expansion portion 140a, so that the LCD 100 can provide larger transparent area than the LCD 200 shown in FIG. 4 and than the LCD 300 shown in FIG. 5, respectively.

As described above, with the design of the aforementioned storage capacitor, the present invention can reduce the opaque area, that is to reduce the area of the opaque main body 124a of the auxiliary capacitor line 124, to increase the transparent area; additional storage capacitance supplied with the extension portion 124b of the auxiliary capacitor line 124 also provides the enough storage capacitance. Hence, the LCD utilizing the design of the storage capacitor of the present invention possesses high aperture ratio, and it is still capable of providing enough storage capacitance.

As being understood by a person skilled in the art, the foregoing preferred embodiments of the present invention are illustrated of the present invention rather than limiting of the present invention. It is intended to cover various modifications and similar arrangements included within the spirit and scope of the appended claims. Therefore, the scope of the claims should be accorded the broadest interpretation so as to encompass all such modifications and similar structure.

What is claimed is:

1. A liquid crystal display (LCD) comprising:
    a first substrate;
    a second substrate;
    a liquid crystal layer disposed between the first and second substrates;
    a plurality of scanning lines parallel to one another and disposed over the first substrate;
    a plurality of data lines, parallel to one another and vertical to the scanning lines, disposed over the first substrate, thereby forming a plurality of pixel regions, each pixel region being arranged in array and defined by two adjacent scanning lines and two adjacent data lines, wherein each data line between every two adjacent scanning lines comprises a first portion, a second portion and two connection portions connecting the first and second portions, and the two connection portions and the second portion define a bent region;
    a plurality of pixel electrodes disposed in the pixel regions, respectively, wherein the first and second portions of each data line are covered respectively with opposite side portions of the two adjacent pixel electrodes;
    a plurality of thin film transistors (TFTs) connected to the pixel electrodes and disposed in the vicinity of intersections of the scanning and data lines, respectively; and
    a plurality of auxiliary capacitor lines, each of which has a main body in parallel to the scanning lines and an extension portion extending outwardly from the main body, wherein the extension portion of each auxiliary capacitor line substantially extends in the direction parallel to the second portion and is disposed in the bent region.

2. The LCD according to claim 1, further comprising a light-shielding matrix disposed over the second substrate for covering the extension portions of the auxiliary capacitor lines.

3. The LCD according to claim 1, wherein the extension portions of the auxiliary capacitor lines are adjacent to the second portions of the corresponding data lines.

4. The LCD according to claim 1, wherein one of the two connection portions is disposed above the corresponding scanning line as a source of the TFT.

5. The LCD according to claim 4, wherein the other connection portion of the data lines is disposed between and parallel to two adjacent scanning lines, and is across two adjacent pixel regions.

6. The LCD according to claim 4, wherein each pixel region further comprises:
   an auxiliary capacitor electrode;
   a connection line for connecting a drain of the TFT to the auxiliary capacitor electrode; and
   a contact for electrically connecting the auxiliary capacitor electrode to the corresponding pixel electrode, so that the auxiliary capacitor electrode and the corresponding pixel electrode both serve as counter electrodes of the corresponding auxiliary capacitor line,
   wherein the connection line is wholly disposed between the two connection portions of the corresponding data line.

7. The LCD according to claim 5, wherein another light-shielding matrix is disposed over the second substrate for covering sources/drains of the TFTs and the connection lines.

8. The LCD according to claim 1, wherein the main body of the auxiliary capacitor lines is extended to cross the second portions of the data lines, and the extension portion of the auxiliary capacitor line is extended in parallel to the second portion of the data lines.

9. The LCD according to claim 1, wherein the first portion of the data lines further comprises a protrudent portion disposed above the corresponding scanning line as a source of the TFT.

10. The LCD according to claim 9, wherein each of the pixel regions further comprises:
    an auxiliary capacitor electrode;
    a connection line for connecting a drain of the TFT to the auxiliary capacitor electrode; and
    a contact for electrically connecting the auxiliary capacitor electrode to the corresponding pixel electrode, so that the auxiliary capacitor electrode and the corresponding pixel electrode both serve as counter electrodes of the corresponding auxiliary capacitor line,
    wherein the another light-shielding matrix has an extension portion covering sources/drains of the TFTs and at least a portion of the connection lines.

11. The LCD according to claim 9, wherein the second substrate has another light-shielding matrix, and each of the pixel regions further comprises:
    an auxiliary capacitor electrode;
    a connection line for connecting a drain of the TFT to the auxiliary capacitor electrode; and
    a contact for electrically connecting the auxiliary capacitor electrode to the corresponding pixel electrode, so that the auxiliary capacitor electrode and the corresponding pixel electrode both serve as counter electrodes of the corresponding auxiliary capacitor line,
    wherein the another light-shielding matrix wholly covers sources/drains of the TFTs and at least a portion of the connection lines.

12. The LCD according to claim 9, wherein each of the connection lines has at least a portion disposed between the protrudent portion of the corresponding data line and the adjacent scanning line.

13. A thin film transistor (TFT) substrate having a plurality of pixel regions arranged in array, comprising:
    a plurality of scanning lines parallel to one another;
    a plurality of data lines parallel to one another and vertical to the scanning lines, thereby forming a plurality of pixel regions, each region being arranged in array and defined by two adjacent scanning lines and two adjacent data lines, wherein each data line between every two adjacent scanning lines comprises a first portion, a second portion and two connection portions, and the two connection portions and the second portion define a bent region;
    a plurality of pixel electrodes disposed in the pixel regions, respectively, wherein the first and second portions of each data line are covered respectively with opposite side portions of the two adjacent pixel electrodes;
    a plurality of TFTs connected to the pixel electrodes and disposed in vicinity of intersections of the scanning and data lines, respectively; and
    a plurality of auxiliary capacitor lines, each of which has a main body in parallel to the scanning lines and an extension portion extending outwardly from the main body,
    wherein the extension portion of each auxiliary capacitor line is substantially extends in the direction parallel to the second portion and disposed in the bent region.

14. The TFT substrate according to claim 13, wherein the extension portions of the auxiliary capacitor lines are adjacent to the second portions of the corresponding data line.

15. The TFT substrate according to claim 13, wherein one of the two connection portions is disposed above the corresponding scanning line as a source of the TFT.

16. The TFT substrate according to claim 15, wherein the other connection portion of the data lines is disposed between and parallel to two adjacent scanning lines, and across two adjacent pixel regions.

17. The TFT substrate according to claim 15, wherein each pixel region further comprises:
    an auxiliary capacitor electrode;
    a connection line for connecting a drain of the TFT to the auxiliary capacitor electrode; and
    a contact for electrically connecting the auxiliary capacitor electrode to the corresponding pixel electrode, so that the auxiliary capacitor electrode and the corresponding pixel electrode both serve as counter electrodes of the corresponding auxiliary capacitor line,
    wherein the connection line is wholly disposed between the two connection portions of the corresponding data line.

18. The TFT substrate according to claim 13, wherein the main body of the auxiliary capacitor lines is extended to cross the second portions of the data lines, and the extension portion of the auxiliary capacitor line is extended in parallel to the second portion of the data lines.

19. The TFT substrate according to claim 13, wherein the first portion of the data lines further comprises a protrudent portion disposed above the corresponding scanning line as a source of the TFT.

20. The TFT substrate according to claim 19, wherein each of the pixel regions further comprises:
    an auxiliary capacitor electrode;
    a connection line for connecting a drain of the TFT to the auxiliary capacitor electrode; and
    a contact for electrically connecting the auxiliary capacitor electrode to the corresponding pixel electrode, so that the auxiliary capacitor electrode and the corresponding pixel electrode both serve as counter electrodes of the corresponding auxiliary capacitor line,
    wherein at least a portion of the connection lines is disposed between the protrudent portion and the adjacent scanning line.

* * * * *